(12) United States Patent
Kaldor (10) Patent No.: US 9,696,850 B2
(45) Date of Patent: *Jul. 4, 2017

(54) DENOISING TOUCH GESTURE INPUT (71) Applicant: Facebook, Inc., Menlo Park, CA (US)

(72) Inventor: Jonathan M. Kaldor, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,833

(22) Filed: Sep. 22, 2015

(65) Prior Publication Data

US 2016/0011772 A1    Jan. 14, 2016

Related U.S. Application Data

(63) Continuation of application No. 13/648,143, filed on Oct. 9, 2012, now Pat. No. 9,164,622.

(51) Int. Cl.
*G06F 3/041* (2006.01)
*G06F 3/0485* (2013.01)
*G06F 3/0488* (2013.01)
*G06F 3/0484* (2013.01)

(52) U.S. Cl.
CPC ......... *G06F 3/0418* (2013.01); *G06F 3/0485* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| 8,600,107 B2* | 12/2013 | Holmgren | G06F 3/042 178/18.01 |
|---|---|---|---|
| 2004/0100479 A1* | 5/2004 | Nakano | G06F 1/1626 715/700 |
| 2005/0237300 A1* | 10/2005 | Baudisch | G06F 3/04812 345/162 |
| 2008/0158169 A1* | 7/2008 | O'Connor | G06F 3/0418 345/173 |
| 2009/0249236 A1* | 10/2009 | Westerman | G06F 3/0235 715/765 |
| 2009/0284550 A1* | 11/2009 | Shimada | G06F 17/5095 345/619 |
| 2010/0020025 A1* | 1/2010 | Lemort | G06F 3/04883 345/173 |
| 2010/0085325 A1* | 4/2010 | King-Smith | G06F 3/03545 345/174 |
| 2010/0245286 A1* | 9/2010 | Parker | G06F 3/0416 345/174 |

(Continued)

*Primary Examiner* — Phenuel Salomon
(74) *Attorney, Agent, or Firm* — Baker Botts L.L.P.

(57) ABSTRACT

In one embodiment, a computing device determines a touch gesture on a touch screen of the computing device. The touch gesture includes two or more data points that each correspond to a particular location on the touch screen and a particular point in time. For each of one or more of the data points, the computing device adjusts a time value representing its particular point in time. For each of one or more of the data points, the computing device adjusts a position value representing its particular location on the touch screen. The computing device fits a curve to the two or more data points to determine a user intent associated with the touch gesture.

60 Claims, 5 Drawing Sheets

(56) References Cited

U.S. PATENT DOCUMENTS

| | | | |
|---|---|---|---|
| 2011/0074699 A1* | 3/2011 | Marr | G06F 3/0485 |
| | | | 345/173 |
| 2012/0092286 A1* | 4/2012 | O'Prey | G06F 3/0416 |
| | | | 345/174 |
| 2012/0120017 A1* | 5/2012 | Worfolk | G06F 3/044 |
| | | | 345/174 |
| 2012/0323521 A1* | 12/2012 | De Foras | G06F 3/017 |
| | | | 702/141 |
| 2013/0120279 A1* | 5/2013 | Plichta | G06F 3/04883 |
| | | | 345/173 |
| 2013/0241847 A1* | 9/2013 | Shaffer | G06F 3/038 |
| | | | 345/173 |

\* cited by examiner

DENOISING TOUCH GESTURE INPUT

PRIORITY

This application is a continuation of U.S. patent application Ser. No. 13/648,143, filed 9 Oct. 2012, the disclosure of which is incorporated herein by reference it its entirety.

TECHNICAL FIELD

This disclosure generally relates to mobile computing devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touch screens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device (which may be a mobile computing device) may determine a touch gesture on a touch screen of the computing device. The touch gesture may include two or more data points, and each data point may correspond to a particular location on the touch screen and a particular point in time. The touch gesture may, for example, be a flick, swipe, tap, drag, or pinch. The computing device may, for each of one or more of the data points, adjust a time value representing the data point's associated particular point in time. The computing device may adjust a time value of a data point based on the proximity of the data point in time to other data points. The computing device may fit a curve to the data points in order to determine a user intent associated with the touch gesture. The user intent may, for example, be a velocity associated with an animation within a graphical user interface (GUI) of an application displayed within the touch screen. The animation may, for example, be scrolling or dismissing an element of the GUI. The curve may be fit using a variety of techniques including, for example, linear least-squares or nonlinear least-squares solutions.

DESCRIPTION OF EXAMPLE EMBODIMENTS

Figure 1:
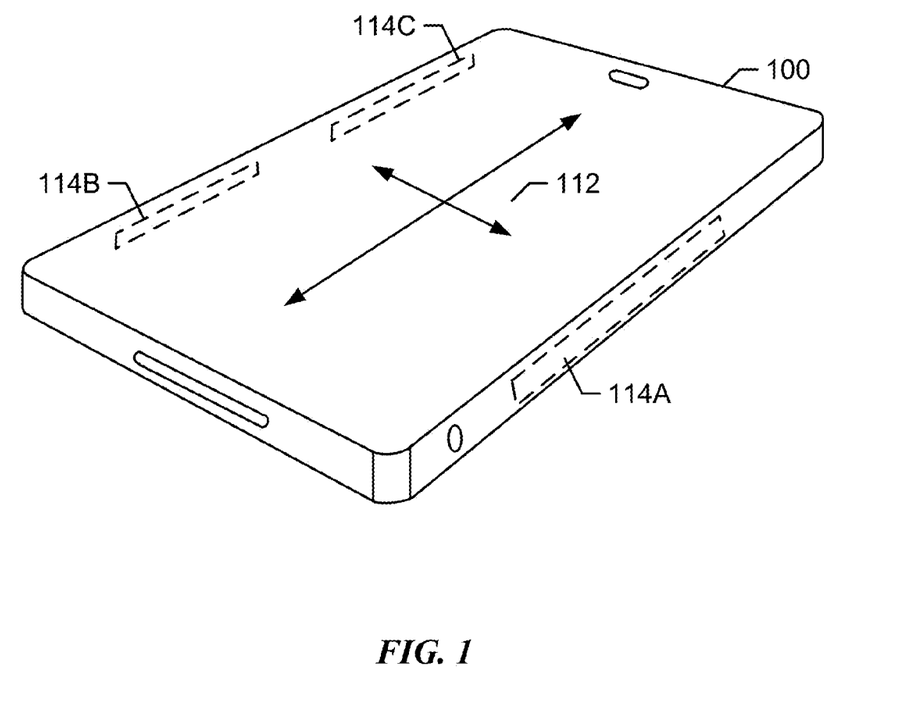
FIG. 1 illustrates an example mobile device.

FIG. 1 illustrates an example mobile device 100. This disclosure contemplates mobile device 100 taking any suitable physical form. As example and not by way of limitation, mobile device 100 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 100 may have a touch screen 112 as an input component. In the example of FIG. 1, touch screen 112 is incorporated on a front surface of mobile device 100. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 114A-C may be incorporated into one or more sides of mobile device 100. Antennae 114A-C are components that convert electric current into radio waves, and vice versa. During transmission of signals, a transmitter applies an oscillating radio frequency (RF) electric current to terminals of antennae 114A-C, and antennae 114A-C radiate the energy of the applied the current as electromagnetic (EM) waves. During reception of signals, antennae 114A-C convert the power of an incoming EM wave into a voltage at the terminals of antennae 114A-C. The voltage may be transmitted to a receiver for amplification.

Figure 2:
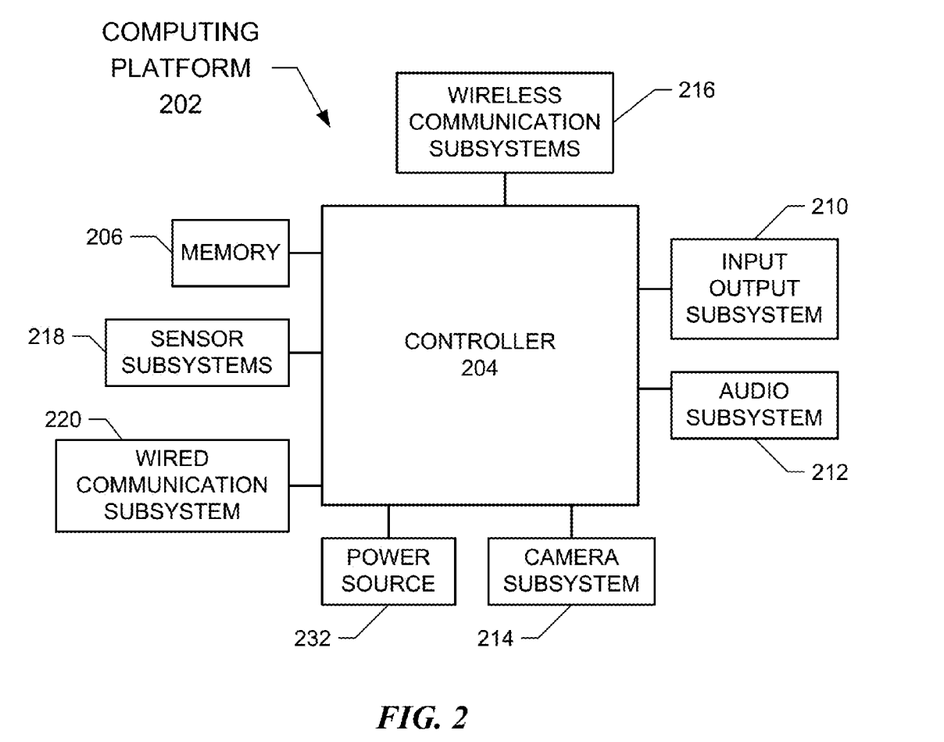
FIG. 2 illustrates an example computing platform of a mobile device.

While the mobile device 100 may be implemented in a variety of different hardware and computing systems, FIG. 2 shows a schematic representation of the main components of an example computing platform of a mobile device, according to various particular embodiments. In particular embodiments, computing platform 202 may comprise controller 204, memory 206, and input output subsystem 210. In particular embodiments, controller 204 which may comprise one or more processors and/or one or more microcontrollers configured to execute instructions and to carry out operations associated with a computing platform. In various embodiments, controller 204 may be implemented as a single-chip, multiple chips and/or other electrical components including one or more integrated circuits and printed circuit boards. Controller 204 may optionally contain a cache memory unit for temporary local storage of instructions, data, or computer addresses. By way of example, using instructions retrieved from memory, controller 204 may control the reception and manipulation of input and output data between components of computing platform 202. By way of example, controller 204 may include one or more processors or one or more controllers dedicated for certain processing tasks of computing platform 202, for example, for 2D/3D graphics processing, image processing, or video processing.

Controller 204 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 206 that is operatively coupled to controller 204.

Memory 206 may encompass one or more storage media and generally provide a place to store computer code (e.g. software and/or firmware) and data that are used by computing platform 202. By way of example, memory 206 may include various tangible computer-readable storage media including Read-Only Memory (ROM) and/or Random-Access Memory (RAM). As is well known in the art, ROM acts to transfer data and instructions uni-directionally to controller 204, and RAM is used typically to transfer data and instructions in a bi-directional manner. Memory 206 may also include one or more fixed storage devices in the form of, by way of example, hard disk drives (HDDs), solid-state drives (SSDs), flash-memory cards (e.g. Secured Digital or SD cards), among other suitable forms of memory coupled bi-directionally to controller 204. Information may also reside on one or more removable storage media loaded into or installed in computing platform 202 when needed. By way of example, any of a number of suitable memory cards (e.g. SD cards) may be loaded into computing platform 202 on a temporary or permanent basis.

Input output subsystem 210 may comprise one or more input and output devices operably connected to controller 204. For example, input output subsystem may include keyboard, mouse, one or more buttons, and/or, display (e.g. liquid crystal display (LCD), or any other suitable display technology). Generally, input devices are configured to transfer data, commands and responses from the outside world into computing platform 202. The display is generally configured to display a graphical user interface (GUI) that provides an easy to use visual interface between a user of the computing platform 202 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 210 may also include touch based devices such as touch pad and touch screen. A touch pad is an input device including a surface that detects touch-based inputs of users. Similarly, a touch screen is a display that detects the presence and location of user touch inputs. Input output system 210 may also include dual touch or multi-touch displays or touch pads that can identify the presence, location and movement of more than one touch inputs, such as two or three finger touches.

In particular embodiments, computing platform 202 may additionally comprise audio subsystem 212, camera subsystem 212, wireless communication subsystem 216, sensor subsystems 218, and/or wired communication subsystem 220, operably connected to controller 204 to facilitate various functions of computing platform 202. For example, Audio subsystem 212, including a speaker, a microphone, and a codec module configured to process audio signals, can be utilized to facilitate voice-enabled functions, such as voice recognition, voice replication, digital recording, and telephony functions. For example, camera subsystem 212, including an optical sensor (e.g. a charged coupled device (CCD), image sensor), can be utilized to facilitate camera functions, such as recording photographs and video clips. For example, wired communication subsystem 220 can include a Universal Serial Bus (USB) port for file transferring, or a Ethernet port for connection to a local area network (LAN). Additionally, computing platform 202 may be powered by power source 232.

Wireless communication subsystem 216 can be designed to operate over one or more wireless networks, for example, a wireless PAN (WPAN) (e.g. a BLUETOOTH), a WI-FI network (e.g. an 802.11a/b/g/n network), a WI-MAX network, a cellular network (such as, for example, a Global System for Mobile Communications (GSM) network, a Long Term Evolution (LTE) network). Additionally, wireless communication subsystem 216 may include hosting protocols such that computing platform 202 may be configured as a base station for other wireless devices. Other input/output devices may include an accelerometer that can be used to detect the orientation of the device.

Sensor subsystem 218 may include one or more sensor devices to provide additional input and facilitate multiple functionalities of computing platform 202. For example, sensor subsystems 218 may include GPS sensor for location positioning, altimeter for altitude positioning, motion sensor for determining orientation of a mobile device, light sensor for photographing function with camera subsystem 212, temperature sensor for measuring ambient temperature, and/or biometric sensor for security application (e.g. fingerprint reader).

In particular embodiments, various components of computing platform 202 may be operably connected together by one or more buses (including hardware and/or software). As an example and not by way of limitation, the one or more buses may include an Accelerated Graphics Port (AGP) or other graphics bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these.

In particular embodiments, mobile device 100 may include a touch pad or a touch screen 112 as an input device. A touch pad is an input device including a surface that detects touch-based inputs of users. Similarly, a touch screen is an electronic visual display surface that may detect the presence and location of user touch inputs. Touch screen 112 may be a single-touch, dual-touch, or multi-touch screen. So-called dual touch or multi-touch input devices refer to devices that may identify the presence, location and movement of more than one touch input, such as two- or three-finger touches. A system incorporating one or more touch-based input devices may monitor one or more touch-sensitive surfaces for touch or near-touch inputs from a user. When one or more such user inputs occur, the system may determine the distinct area(s) of contact and identify the nature of the touch or near-touch input(s) via, e.g., geometric features and geometric arrangements (e.g. location or movement).

The system may also determine if the inputs correspond to various touch events or gestures (e.g. tap, drag, swipe, pinch, or flick). These touch events may each correspond to certain actions to be taken by mobile device 100. For example, a flick up may correspond to the action of scrolling upward within an application displayed via touch screen 112, a flick down may correspond to the action of scrolling downward within an application displayed via touch screen 112, or (in other cases), a flick up or down may correspond to the dismissal of an element of a graphical user interface (e.g. within an application running on mobile device 100) being displayed via touch screen 112. A user may also have an intent conveyed via the user's touch gesture. For example, a user may know that the gesture of a flick will scroll within an application displayed via touch screen 112. The velocity of the user's gesture may indicate the user's intent with respect to, for example, the velocity associated with an animation within the graphical user interface of an application displayed by touch screen 112. The user may flick quickly, intending that the corresponding action by mobile device 100 be a quick scrolling within the application. The user may also flick slowly, intending that the corresponding action by mobile device 100 be a slow scrolling within the application. Similarly, the user may flick slowly or quickly, intending a slow or quick dismissal of an element of the GUI displayed on touch screen 112.

Recognition of touch events by a system with one or more touch-based input devices—i.e., identifying one or more touch inputs by a user and determining corresponding touch event(s)—may be implemented by a combination of hardware, software, or firmware (or device drivers). One or more libraries may be used by one or more applications running on mobile device 100 to recognize touch events. For example, mobile device 100 may comprise (e.g., as part of computing platform 202) one or more device drivers communicating with one or more touch-based input devices to detect touch inputs. Mobile device 100 may comprise a touch gesture library containing touch event modules (e.g. computer code) or logic for recognizing touch inputs detected by the device drivers as touch events or gestures (e.g. tap, drag, swipe, pinch, or flick). One or more applications running on mobile device 100 may detect and process or respond to touch events or gestures by subscribing as listeners to touch event modules in the touch gesture library.

Figure 3A:
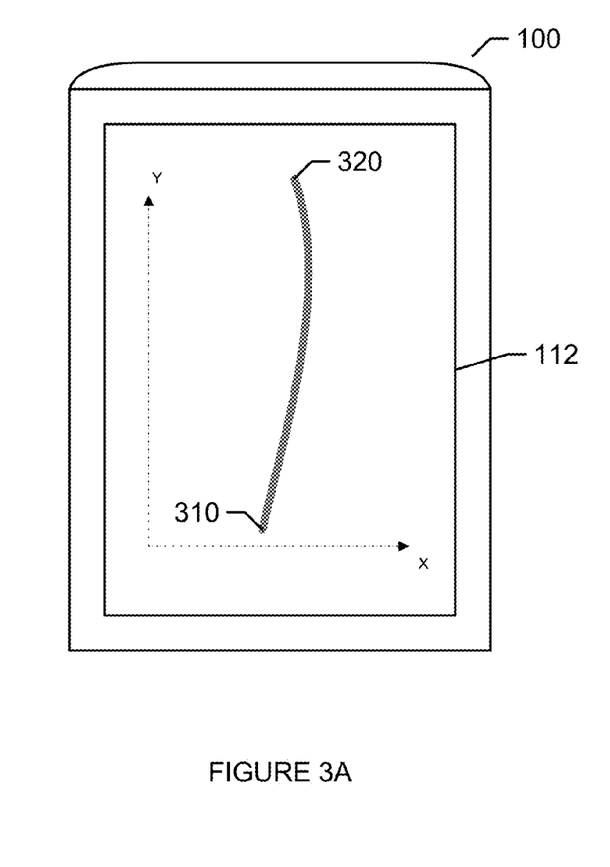
FIG. 3A illustrates an example user touch gesture.

A user may perform a touch gesture (e.g. flick up) on the surface of touch screen 112. Touch screen 112, in combination with device drivers and a touch gesture library, may allow mobile device 100 (e.g. controller 204) to determine a touch gesture based on a touch trajectory (e.g. a series of data points) of the user's touch gesture input on the surface of touch screen 112. FIG. 3A depicts an example trace of a touch gesture performed by a user on the surface of touch screen 112 of mobile device 100. In the example of FIG. 3A, a user performs a flick upward on the surface of touch screen 112. The flick gesture as performed by the user (with, e.g., a finger) begins at point 310 on touch screen 112 and ends at point 320 on touch screen 112. The flick gesture, including its starting and ending points, may be located within a two-dimensional coordinate system of points on the surface of touch screen 112, indicated by the dashed x- and y-axes in FIG. 3A. In many cases, the touch inputs received by mobile device 100 may be noisy. The determination of a user's finger position at various times during a touch gesture may be hampered by external sources of noise (e.g. ambient noise from the atmosphere the mobile device is operating in) or by internal sources of noise (e.g. noisiness in the event processing hardware, software, or firmware of the mobile device). Due to these noise factors, mobile device 100 may only capture data representing a subset of a user's touch gesture, such as a set of points along the path of the user's touch gesture.

Figure 3B:
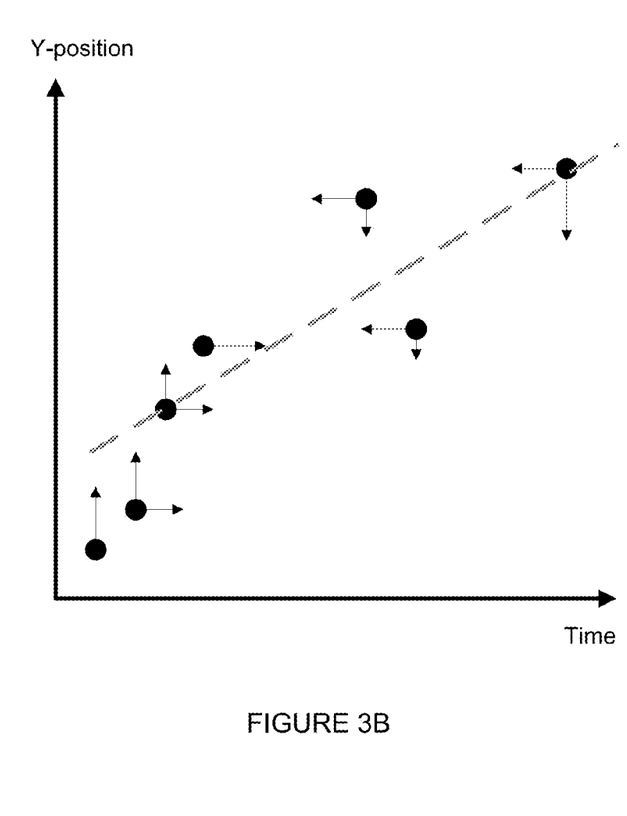
FIG. 3B illustrates an example set of data points of a user touch gesture.

In particular embodiments, mobile device 100 may capture a series of data points that together form a touch trajectory from the noisy input received from a user's touch gesture on touch screen 112. FIG. 3B illustrates an example series of data points captured via touch screen 112 of a user's y-direction touch trajectory over time. In the example of FIG. 3B, a set of seven data points of the user's position are collected over time by mobile device 100. These seven data points are not evenly spaced in time or in position in this example, as may occur due to the effects of noise. In other examples, mobile device 100 may capture a series of data points from a touch trajectory, where each of the data points indicates a user's x-direction position over time. In yet other examples, mobile device 100 may capture a series of data points from a touch trajectory, where each of the data points indicates a user's x- and y-direction position over time.

A user's touch gesture and intention may be determined from this series of data points constituting a touch trajectory. For example, if it is determined that the user made an upward flicking motion with a particular velocity, and if the upward flicking motion corresponds (e.g. in the touch gesture library) to an upward scrolling action within the graphical user interface of an application running on mobile device 100, the animation of the upward scrolling action may be performed with a velocity matching or proportional to that of the user. The user's velocity may be determined based on a curve fitted to the series of data points (forming the user touch trajectory) captured from touch screen 112. In the example of FIG. 3B, the data points are not evenly spaced in time or in position. As such, performing an analysis to fit these points to a curve may not yield desirable results. In particular embodiments, before a curve is fitted to the series of data points in order to determine the user's touch gesture velocity (e.g. an average velocity over a time period, or a velocity at a given point in time), the data points are "smoothed" both in time and in position.

Temporal smoothing may be performed, for example, when data points are not evenly spaced in time. As an example, the data points may be clustered together in time in some timeframes, and spread far apart in time in other timeframes, as illustrated in FIG. 3B. The process of smoothing these data points in time includes adjusting (e.g. shifting) one or more of the data points in time (e.g. changing the time value of that data point) so that the data points are more evenly spaced in time. Smoothing the data points may involve adjusting some data points by a nonzero amount of time and adjusting other data points by a negligible or zero amount of time. This may, in particular embodiments, be done in such a manner that the data points are completely evenly spaced in time (e.g. by taking the total time period over which the data points are collected and dividing this time period by the number of data points to obtain the interval of time between each point). In other embodiments, the smoothing or shifting of data points in time may be done less than perfectly evenly in time. This process is illustrated in FIG. 3B. The first four data points collected are clustered closely together, there is a gap in time before the next two data points are collected, and then a final gap in time before the last data point. In the example of FIG. 3B, the temporal smoothing process involves shifting the time values of the second, third, and fourth data points later in time (e.g. to the right on the time axis), and shifting the time values of the fifth, sixth, and seventh data points earlier in time (e.g. to the left on the time axis) in order to provide a more even spacing in time of the data points. The position values of the data points may be changed (as in FIG. 3B, to be described below) or left unchanged.

Positional smoothing may be performed on a set of data points, either alone or in conjunction with temporal smoothing. As an example, the data points may be unevenly spaced in position, as illustrated in FIG. 3B (e.g. along the y-axis). The process of smoothing these data points with respect to position includes adjusting (e.g. shifting) one or more of the data points in position (e.g. changing the position value of that data point) so that the data points are pulled toward the average position (e.g. along the y-axis) of the data points. Smoothing the data points may involve adjusting some data points by a nonzero position amount and adjusting other data points by a negligible or zero position amount. This may, in particular embodiments, be done by taking the minimum and maximum position values to determine the positional range over which the data points lie and dividing this range by the number of data points to obtain the average position. This process is illustrated in FIG. 3B. In the example of FIG. 3B, the positional smoothing process involves shifting the position (e.g. y-axis) values of the first, second, and third data points higher toward the average position value (e.g. higher on the y-axis), and shifting the position values of the fifth, sixth, and seventh data points lower toward the average position value (e.g. lower on the y-axis). In this process, the temporal values of the data points may be changed (as in FIG. 3B, described above) or left unchanged.

A curve may be fitted to the series of data points (e.g. after smoothing of the data points with respect to time, position, or both) in order to determine the user's touch gesture velocity. In particular embodiments, the curve may be fitted using linear methods (e.g. linear least squares or weighted linear least squares), polynomial methods, spline-based methods, or any other type of non-linear method (e.g. non-linear least squares). This disclosure contemplates any suitable method of fitting a curve to the series of data points, as appropriate. In the example of FIG. 3B, the curve fitted to the data points takes the form of a line. This line may, for example, be calculated using weighted linear least squares. The user's velocity in the touch gesture represents the slope of this line (or, generally, the derivative of the fitted curve calculated, e.g., using numerical methods at a particular point in time). Based on this velocity, which may, as described above, represent a user's intent, mobile device 100 (e.g. controller 204) may take an action corresponding to the user's gesture and intent. For example, if the user's gesture velocity for the upward flick illustrated in FIG. 3B is determined to be 5 cm/s, the mobile device may animate the upward scrolling action corresponding to the upward flick gesture at a speed of 5 cm/s (or, in other examples, at a speed proportional to 5 cm/s).

Figure 4:
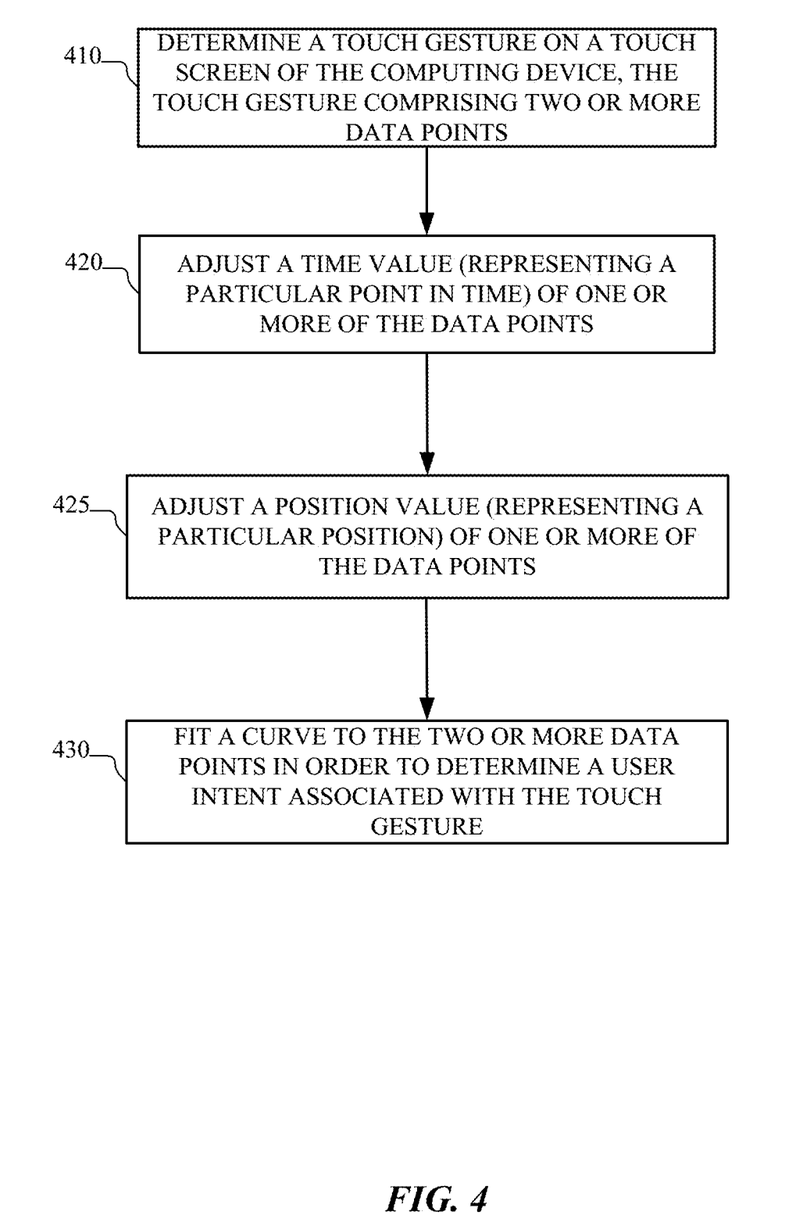
FIG. 4 illustrates an example method for denoising user touch gesture input.

FIG. 4 illustrates an example method for denoising user touch gesture inputs. The method may begin at step 410, where a computing device (e.g. mobile device 100) determines a touch gesture on a touch screen of the computing device. The touch gesture may include two or more data points, and each data point corresponds to a particular location on the touch screen and a particular point in time. At step 420, the computing device adjusts a time value (representing a particular point in time) of one or more of the data points. At step 425, the computing device adjusts a position value (representing a particular location, e.g. on touch screen 112) of one or more of the data points. Positional smoothing and temporal smoothing may be performed independently, such that there is more positional smoothing than temporal smoothing, or vice versa. At step 430, the computing device fits a curve to the two or more data points in order to determine a user intent associated with the touch gesture. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
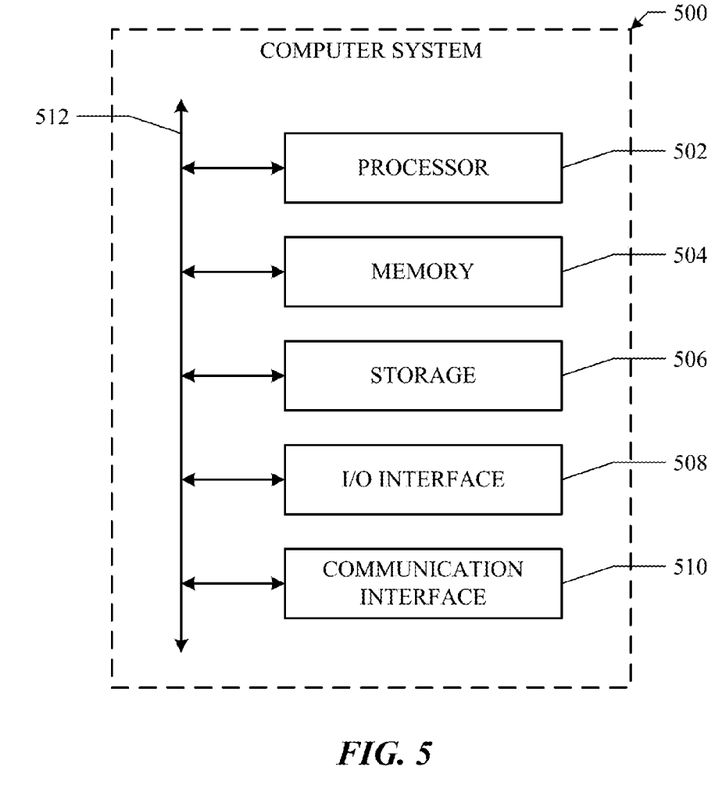
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, determining a touch gesture on a touch screen of the computing device, the touch gesture comprising two or more data points that each correspond to a particular location on the touch screen and a particular point in time, wherein the data points correspond to different respective points in time;
    by the computing device, for each of one or more of the data points, adjusting a time value representing its particular point in time with respect to time values for respective other ones of the data points; and
    by the computing device, fitting a curve to the two or more data points to determine a user intent associated with the touch gesture.

2. The method of claim 1, wherein the user intent is a velocity associated with an animation within a graphical user interface (GUI) displayed by the touch screen.

3. The method of claim 2, wherein the animation comprises scrolling.

4. The method of claim 2, wherein the animation comprises dismissing an element of the GUI.

5. The method of claim 1, wherein the user intent is a velocity associated with a touch event received by the touch screen.

6. The method of claim 5, wherein the touch event comprises a pinch, a drag, or a tap.

7. The method of claim 1, wherein the fitting the curve comprises determining a linear solution, a non-linear least-squares solution, a spline-based solution, or a polynomial solution.

8. The method of claim 1, wherein the time value of at least one of the data points is adjusted based on a proximity of the time value to one or more other time values of one or more other data points.

9. The method of claim 1, wherein the time value of at least one of the data points is adjusted based on a proximity of a position value to one or more other position values of one or more other data points, wherein a position value represents the particular location of the data point on the touch screen with respect to position values representing particular locations for the respective other ones of the data points.

10. The method of claim 1, wherein the time value of at least one of the data points is adjusted based on a computed average interval between the data points.

11. A method comprising:
    by a computing device, determining a touch gesture on a touch screen of the computing device, the touch gesture comprising two or more data points that each correspond to a particular location on the touch screen and a particular point in time, wherein the data points correspond to different respective points in time;
    by the computing device, for each of one or more of the data points, adjusting a position value representing its particular location on the touch screen with respect to position values representing particular locations for respective other ones of the data points; and
    by the computing device, fitting a curve to the two or more data points to determine a user intent associated with the touch gesture.

12. The method of claim 11, wherein the user intent is a velocity associated with an animation within a graphical user interface (GUI) displayed by the touch screen.

13. The method of claim 12, wherein the animation comprises scrolling.

14. The method of claim 12, wherein the animation comprises dismissing an element of the GUI.

15. The method of claim 11, wherein the user intent is a velocity associated with a touch event received by the touch screen.

16. The method of claim 15, wherein the touch event comprises a pinch, a drag, or a tap.

17. The method of claim 11, wherein the fitting the curve comprises determining a linear solution, a non-linear least-squares solution, a spline-based solution, or a polynomial solution.

18. The method of claim 11, wherein the position value of at least one of the data points is adjusted based on a proximity of the position value to one or more other position values of one or more other data points.

19. The method of claim 11, wherein the position value of at least one of the data points is adjusted based on a proximity of a time value to one or more other time values of one or more other data points, wherein a time value represents the particular point in time corresponding to the data point with respect to time values for respective other ones of the data points.

20. The method of claim 11, wherein the position value of at least one of the data points is adjusted based on an average position value of the data points with respect to at least one positional axis.

21. One or more computer-readable non-transitory storage media embodying software that is operable when executed to:
   determine a touch gesture on a touch screen of the computing device, the touch gesture comprising two or more data points that each correspond to a particular location on the touch screen and a particular point in time, wherein the data points correspond to different respective points in time;
   for each of one or more of the data points, adjust a time value representing its particular point in time with respect to time values for respective other ones of the data points; and
   fit a curve to the two or more data points to determine a user intent associated with the touch gesture.

22. The media of claim 21, wherein the user intent is a velocity associated with an animation within a graphical user interface (GUI) displayed by the touch screen.

23. The media of claim 22, wherein the animation comprises scrolling.

24. The media of claim 22, wherein the animation comprises dismissing an element of the GUI.

25. The media of claim 21, wherein the user intent is a velocity associated with a touch event received by the touch screen.

26. The media of claim 25, wherein the touch event comprises a pinch, a drag, or a tap.

27. The media of claim 21, wherein the fitting the curve comprises determining a linear solution, a non-linear least-squares solution, a spline-based solution, or a polynomial solution.

28. The media of claim 21, wherein the time value of at least one of the data points is adjusted based on a proximity of the time value to one or more other time values of one or more other data points.

29. The media of claim 21, wherein the time value of at least one of the data points is adjusted based on a proximity of a position value to one or more other position values of one or more other data points, wherein a position value represents the particular location of the data point on the touch screen with respect to position values representing particular locations for the respective other ones of the data points.

30. The media of claim 21, wherein the time value of at least one of the data points is adjusted based on a computed average interval between the data points.

31. One or more computer-readable non-transitory storage media embodying software that is operable when executed to:
   determine a touch gesture on a touch screen of the computing device, the touch gesture comprising two or more data points that each correspond to a particular location on the touch screen and a particular point in time, wherein the data points correspond to different respective points in time;
   for each of one or more of the data points, adjust a position value representing its particular location on the touch screen with respect to position values representing particular locations for respective other ones of the data points; and
   fit a curve to the two or more data points to determine a user intent associated with the touch gesture.

32. The media of claim 31, wherein the user intent is a velocity associated with an animation within a graphical user interface (GUI) displayed by the touch screen.

33. The media of claim 32, wherein the animation comprises scrolling.

34. The media of claim 32, wherein the animation comprises dismissing an element of the GUI.

35. The media of claim 31, wherein the user intent is a velocity associated with a touch event received by the touch screen.

36. The media of claim 35, wherein the touch event comprises a pinch, a drag, or a tap.

37. The media of claim 31, wherein the fitting the curve comprises determining a linear solution, a non-linear least-squares solution, a spline-based solution, or a polynomial solution.

38. The media of claim 31, wherein the position value of at least one of the data points is adjusted based on a proximity of the position value to one or more other position values of one or more other data points.

39. The media of claim 31, wherein the position value of at least one of the data points is adjusted based on a proximity of a time value to one or more other time values of one or more other data points, wherein a time value represents the particular point in time corresponding to the data point with respect to time values for respective other ones of the data points.

40. The media of claim 31, wherein the position value of at least one of the data points is adjusted based on an average position value of the data points with respect to at least one positional axis.

41. A system comprising: one or more processors; and a memory coupled to the processors comprising instructions executable by the processors, the processors being operable when executing the instructions to:
   determine a touch gesture on a touch screen of the computing device, the touch gesture comprising two or more data points that each correspond to a particular location on the touch screen and a particular point in time, wherein the data points correspond to different respective points in time;
   for each of one or more of the data points, adjust a time value representing its particular point in time with respect to time values for respective other ones of the data points; and
   fit a curve to the two or more data points to determine a user intent associated with the touch gesture.

42. The system of claim 41, wherein the user intent is a velocity associated with an animation within a graphical user interface (GUI) displayed by the touch screen.

43. The system of claim 42, wherein the animation comprises scrolling.

44. The system of claim 42, wherein the animation comprises dismissing an element of the GUI.

45. The system of claim 41, wherein the user intent is a velocity associated with a touch event received by the touch screen.

46. The system of claim 45, wherein the touch event comprises a pinch, a drag, or a tap.

47. The system of claim 41, wherein the fitting the curve comprises determining a linear solution, a non-linear least-squares solution, a spline-based solution, or a polynomial solution.

48. The system of claim 41, wherein the time value of at least one of the data points is adjusted based on a proximity of the time value to one or more other time values of one or more other data points.

49. The system of claim 41, wherein the time value of at least one of the data points is adjusted based on a proximity of a position value to one or more other position values of one or more other data points, wherein a position value represents the particular location of the data point on the touch screen with respect to position values representing particular locations for the respective other ones of the data points.

50. The system of claim 41, wherein the time value of at least one of the data points is adjusted based on a computed average interval between the data points.

51. A system comprising: one or more processors; and a memory coupled to the processors comprising instructions executable by the processors, the processors being operable when executing the instructions to:
   determine a touch gesture on a touch screen of the computing device, the touch gesture comprising two or more data points that each correspond to a particular location on the touch screen and a particular point in time, wherein the data points correspond to different respective points in time;
   for each of one or more of the data points, adjust a position value representing its particular location on the touch screen with respect to position values representing particular locations for respective other ones of the data points; and
   fit a curve to the two or more data points to determine a user intent associated with the touch gesture.

52. The system of claim 51, wherein the user intent is a velocity associated with an animation within a graphical user interface (GUI) displayed by the touch screen.

53. The system of claim 52, wherein the animation comprises scrolling.

54. The system of claim 52, wherein the animation comprises dismissing an element of the GUI.

55. The system of claim 51, wherein the user intent is a velocity associated with a touch event received by the touch screen.

56. The system of claim 55, wherein the touch event comprises a pinch, a drag, or a tap.

57. The system of claim 51, wherein the fitting the curve comprises determining a linear solution, a non-linear least-squares solution, a spline-based solution, or a polynomial solution.

58. The system of claim 51, wherein the position value of at least one of the data points is adjusted based on a proximity of the position value to one or more other position values of one or more other data points.

59. The system of claim 51, wherein the position value of at least one of the data points is adjusted based on a proximity of a time value to one or more other time values of one or more other data points, wherein a time value represents the particular point in time corresponding to the data point with respect to time values for respective other ones of the data points.

60. The system of claim 51, wherein the position value of at least one of the data points is adjusted based on an average position value of the data points with respect to at least one positional axis.

* * * * *